(12) United States Patent
Azenkot et al.

(10) Patent No.: US 8,238,492 B2
(45) Date of Patent: Aug. 7, 2012

(54) METHOD AND APPARATUS FOR PACKET DETECTION VIA CROSS-CORRELATION IN THE PRESENCE OF FREQUENCY OFFSET

(75) Inventors: Yehuda Azenkot, San Jose, CA (US); Zvi Bernstein, San Jose, CA (US)

(73) Assignee: Sigma Designs, Inc., Milpitas, CA (US)

( * ) Notice: Subject to any disclaimer, the term of this patent is extended or adjusted under 35 U.S.C. 154(b) by 210 days.

(21) Appl. No.: 12/784,494

(22) Filed: May 20, 2010

(65) Prior Publication Data
US 2011/0249778 A1    Oct. 13, 2011

Related U.S. Application Data

(60) Provisional application No. 61/323,483, filed on Apr. 13, 2010.

(51) Int. Cl.
*H04L 27/06*    (2006.01)
(52) U.S. Cl. ......... 375/343; 375/316; 375/340; 708/422
(58) Field of Classification Search .................. 375/343, 375/316, 340; 708/5, 422
See application file for complete search history.

(56) References Cited

U.S. PATENT DOCUMENTS

| | | | | |
|---|---|---|---|---|
| 4,346,461 | A | * | 8/1982 | Muir ................. 367/39 |
| 7,672,405 | B2 | * | 3/2010 | Lin et al. .......... 375/345 |
| 2003/0137996 | A1 | * | 7/2003 | Roh et al. ........ 370/491 |
| 2009/0257483 | A1 | * | 10/2009 | French et al. .... 375/230 |

* cited by examiner

*Primary Examiner* — Sam K Ahn
*Assistant Examiner* — Leila Malek
(74) *Attorney, Agent, or Firm* — Perkins Coie LLP; Aaron Wininger

(57) ABSTRACT

An apparatus and method for packet detection using cross-correlation in the presence of frequency offset. The method comprises: segmenting a received signal; and cross-correlating each segment with an expected signal. The apparatus comprises a slicer that segments a received signal; and a cross correlator that cross-correlates each segment with an expected signal.

15 Claims, 4 Drawing Sheets

METHOD AND APPARATUS FOR PACKET DETECTION VIA CROSS-CORRELATION IN THE PRESENCE OF FREQUENCY OFFSET

PRIORITY REFERENCE TO PRIOR APPLICATION

This application claims benefit of and incorporates by reference U.S. patent application Ser. No. 61/323,483, entitled "Cross-Correlation in the Presence of Frequency Offset," filed on Apr. 13, 2010, by inventors Yehuda Azenkot et al.

TECHNICAL FIELD

This invention relates generally to receivers and more particularly, but not exclusively, provides a method and apparatus for packet detection using cross-correlation in the presence of frequency offset.

BACKGROUND

Packet detection may be done via autocorrelation, which is correlation of a received signal with its delayed version; and cross-correlation, which is correlation of the received signal with an expected signal. The expected signal is the transmitted reference signal that is complex conjugated and order-reversed.

Autocorrelation is more robust to echoes, but its peak is not adequately sharp and it is susceptible to any periodic signal with the same period as the delay of the autocorrelation. On the other hand, cross-correlation is sensitive to channel echoes and frequency offset but its peak is distinctive.

Accordingly, a new apparatus and method are needed for packet detection.

SUMMARY

Embodiments of the invention provide a method and apparatus for packet detection using cross-correlation in the presence of frequency offset. The method comprises: segmenting a received signal; and cross-correlating each segment with an expected signal. The apparatus (a packet detector or a device, such as a receiver, incorporating a packet detector) comprises a slicer that segments a received signal; and a cross correlator that cross-correlates each segment with an expected signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
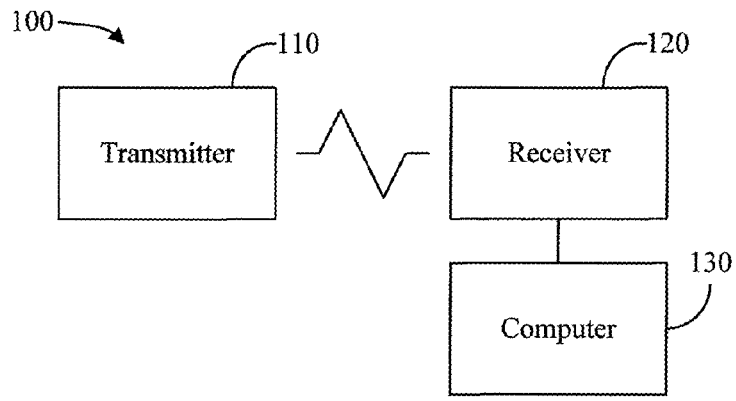
FIG. 1 is a block diagram illustrating a network system.

FIG. 1 is a block diagram illustrating a network system 100. The system 100 comprises a transmitter 110, a receiver 120 and a device (e.g., computer, set top box, digital video recorder, etc.) 130. The transmitter is communicatively coupled, wired or wirelessly, to the receiver 120, which is in turn communicatively coupled, wired or wirelessly, to the device 130. The transmitter 110 transmits an analog signal to the receiver 120, which converts the analog signal into a digital signal for the device 130.

Figure 2:
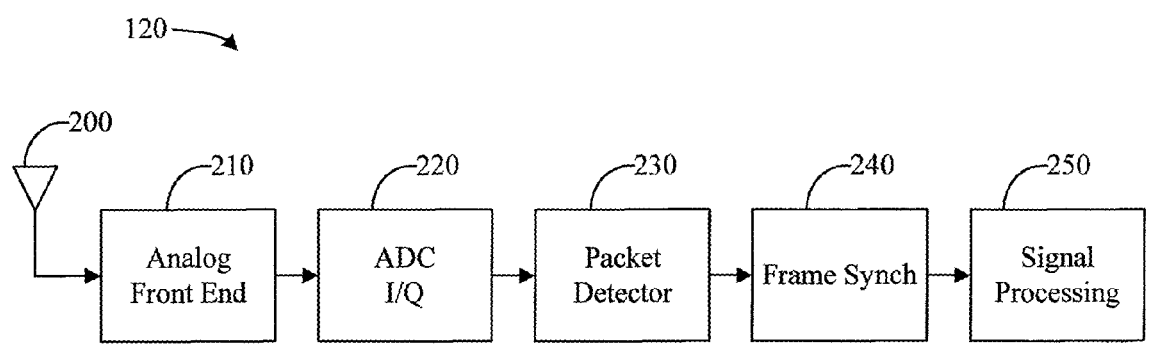
FIG. 2 is a block diagram illustrating a receiver according to an embodiment of the invention.

FIG. 2 is a block diagram illustrating the receiver 120 according to an embodiment of the invention. A signal enters a receiving block 200 (e.g., receiving antenna or cable, etc.), which is coupled to an analog front end 210. The analog front end 210 produces in-phase and quadrature (I/Q) signals which enter an analog-to-digital converter (ADC) 220. The ADC 220 is coupled to a packet detector 230 that detects the presence of a packet and establishes symbol boundaries. The packet detector 230 is coupled to a frame synchronization block 240. After frame synchronization is established, the signal enters a signal processing block 250, which can include such functions as fast Fourier transform, channel equalization, and decoding in an embodiment. The output of this block 250 is the decoded data.

In an embodiment, packet detection is done via cross-correlation of a received signal with a Long Sequence (LS). The cross-correlation is done by calculating the squared absolute value of the standard cross-correlation, which is given by $$XCOR = \left| \sum_{i=1}^{N} r_i \cdot s_i^* \right|^2 \qquad \text{Equation 1}$$

where r is the received signal and s is the expected signal. The cross-correlation goes through an absolute value to mitigate an unknown phase of the received signal.

The standard cross-correlation output of the received signal with the expected LS is reduced when the received signal has a frequency offset. The maximum possible frequency offset for the Multimedia Over Coax Alliance (MoCA) 2.0 standard is 325 kHz. It's obtained for the RF center frequency of 1625 MHz and Rx clock offset of 200 ppm relative to the transmission signal.

$$\Delta f_{max} = 2 \cdot 100e - 6 \cdot 1625e6 = 325 \text{ kHz}$$

The effect of the frequency offset can be revealed from the maximum phase offset generated within the LS duration. Note that only half of the phase offset should be considered because the initial phase offset can be the negative of the half of the previous maximum phase offset. The phase offset for N=128 samples and sampling clock of 100 MHz ($\Delta t=1/(100$ MHz$)=1e-8$) is given by:

$$\Delta \theta = \frac{1}{2} \cdot 2\pi \cdot \Delta f \cdot N \cdot \Delta t = \frac{1}{2} \cdot 2\pi \cdot (2 \cdot 100e-6) \cdot 1625e6 \cdot 128/100e6 = 2\pi \cdot 0.21$$

Simulation shows that this phase offset causes degradation of 2.6 dB to the cross-correlation peak.

In order to mitigate the effect of the frequency offset, the cross-correlation peak can be searched in 2 dimensions, time and frequency. The cross-correlation can be calculated for a couple of possible values of frequency offset corrections. The cross-correlation peak is the maximum of all the possible cross-correlation results, each performed with different frequency offset correction. The cross-correlation as a function of a frequency offset correction, $\Delta f$, is given by:

$$y(\Delta f) = \left| \sum_{i=1}^{N} r_i \cdot s_i^* \cdot e^{-j2\pi \cdot \Delta f \cdot \Delta t \cdot i} \right|^2$$

Figure 3:
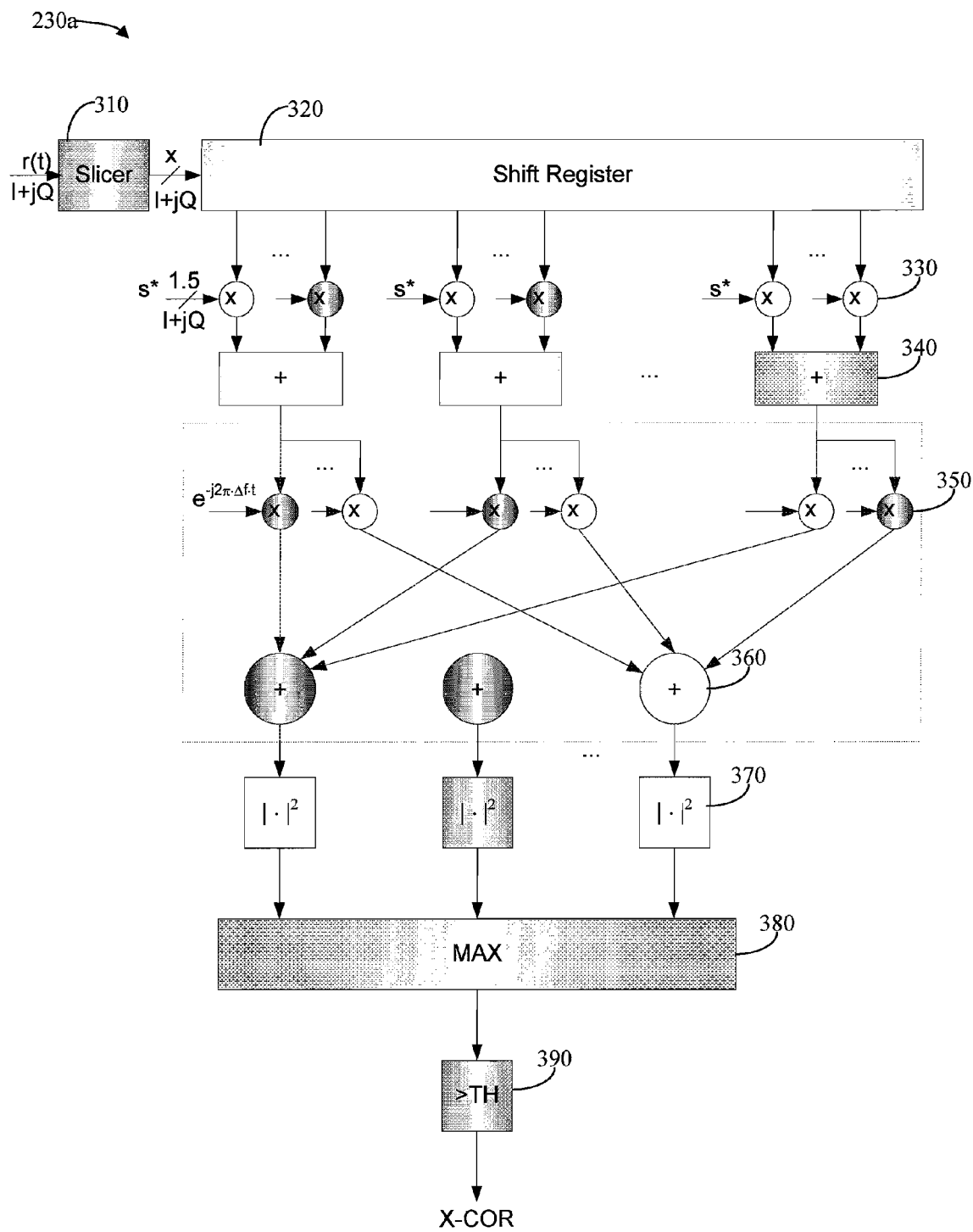
FIG. 3 is a block diagram illustrating a packet detector of the receiver according to an embodiment of the invention.

As illustrated in FIG. 3, an embodiment of the invention splits the cross-correlation into a finite number (K) of segments and calculates the cross-correlation of each segment separately. The phase of the cross-correlation of each segment can be corrected by de-rotation according to the expected phase offset due to the assumed frequency offset. Then, the partial cross-correlations after phase de-rotation of the K segments are summed coherently. After the summation, a square of the absolute value is calculated to mitigate the unknown received phase offset. The squared-absolute cross-correlation as a function of the assumed frequency offset correction, $\Delta f$, is given by:

$$y(\Delta f) = \left| \sum_{i=1}^{N/K} r_i \cdot s_i^* \cdot e^{-j2\pi \cdot \Delta f \cdot \Delta t \cdot i} + \sum_{i=N/K+1}^{2 \cdot N/K} r_i \cdot s_i^* \cdot e^{-j2\pi \cdot \Delta f \cdot \Delta t \cdot i} + \ldots + \sum_{i=(K-1) \cdot N/K}^{N} r_i \cdot s_i^* \cdot e^{-j2\pi \cdot \Delta f \cdot \Delta t \cdot i} \right|^2$$

The partial cross-correlation of each segment can be approximated by using a constant phase value which is the phase offset at the beginning of each segment. Note that the phase offset can be taken from any time index because the absolute value cancels out any fixed phase offset.

$$y(\Delta f) \approx \left| \left(\sum_{i=1}^{N/K} r_i \cdot s_i^*\right) \cdot e^{-j2\pi \cdot \Delta f \cdot \Delta t \cdot 0 \cdot \frac{N}{K}} + \left(\sum_{i=N/K+1}^{2 \cdot N/K} r_i \cdot s_i^*\right) \cdot e^{-j2\pi \cdot \Delta f \cdot \Delta t \cdot 1 \cdot \frac{N}{K}} + \ldots + \left(\sum_{i=(K-1) \cdot N/K+1}^{N} r_i \cdot s_i^*\right) \cdot e^{-j2\pi \cdot \Delta f \cdot \Delta t \cdot (K-1) \cdot \frac{N}{K}} \right|^2$$

Replacing the cross-correlation of each segment by $x(n)$, where $n = -(K-1)/2, \ldots, 0, \ldots, +(K-1)/2$, and assuming, without limiting the generality of the embodiment, that the number of segments, K, is an odd number, yields:

$$y(\Delta f) \approx \left| x\left(-\frac{K-1}{2}\right) \cdot e^{j2\pi \cdot \Delta f \cdot \Delta t \cdot 0 \cdot \frac{N}{K}} + x\left(-\frac{K-1}{2}+1\right) \cdot e^{-j2\pi \cdot \Delta f \cdot \Delta t \cdot 1 \cdot \frac{N}{K}} + x\left(-\frac{K-1}{2}+2\right) \cdot e^{-j2\pi \cdot \Delta f \cdot \Delta t \cdot 2 \cdot \frac{N}{K}} \ldots + x\left(\frac{K-1}{2}\right) \cdot e^{-j2\pi \cdot \Delta f \cdot \Delta t \cdot (K-1) \cdot \frac{N}{K}} \right|^2$$

Multiplying all the variables inside the squared absolute value by a constant of:

$$e^{j2\pi \cdot \Delta f \cdot \Delta t \cdot \frac{N}{K} \cdot \frac{K-1}{2}}.$$

yields:

$$y(\Delta f) \approx \left| \sum_{n=-\frac{K-1}{2}}^{\frac{K-1}{2}} x(n) \cdot e^{-j2\pi \cdot \Delta f \cdot \Delta t \cdot \frac{N}{K} \cdot n} \right|^2 \quad \text{Equation 2}$$

$$y(\Delta f) \approx \left| x(0) + \sum_{n=1}^{\frac{K-1}{2}} (x(-n) + x(n)) \cdot \cos\left(2\pi \cdot \Delta f \cdot \Delta t \cdot \frac{N}{K} \cdot n\right) + j \cdot (x(-n) - x(n)) \cdot \sin\left(2\pi \cdot \Delta f \cdot \Delta t \cdot \frac{N}{K} \cdot n\right) \right|^2 \quad \text{Equation 3}$$

Note that the multiplication by the constant does not change the result because its absolute value is 1.

The cross-correlation is calculated for a number of known values of frequency offsets.

FIG. 3 is a block diagram illustrating a packet detector 230a implementing the embodiment of the invention discussed above. The detector 230a includes a slicer 310 coupled to a shift register 320. The slicer 310 receives an I/Q signal and slices it into K segments for storage in the shift register 320. The segments are then each multiplied with the expected signal (LS) by multipliers 330, which are coupled to the shift register 320. The results are summed by adders 340, which are coupled to the multipliers 330. The summed results are then multiplied by a frequency offset, which can be a constant, by multipliers 350, which are coupled to the adders 340. These results are then summed by adders 360, which are coupled to the multipliers. Blocks 370 then take the absolute value and square the results. Block 380 then finds the maximum and block 390 determines if the maximum is greater than a threshold, in which case, cross-correlation is achieved indicating a packet has been detected. The multipliers 330 through the threshold block 390 can be referred to as a cross correlator.

Figure 4:
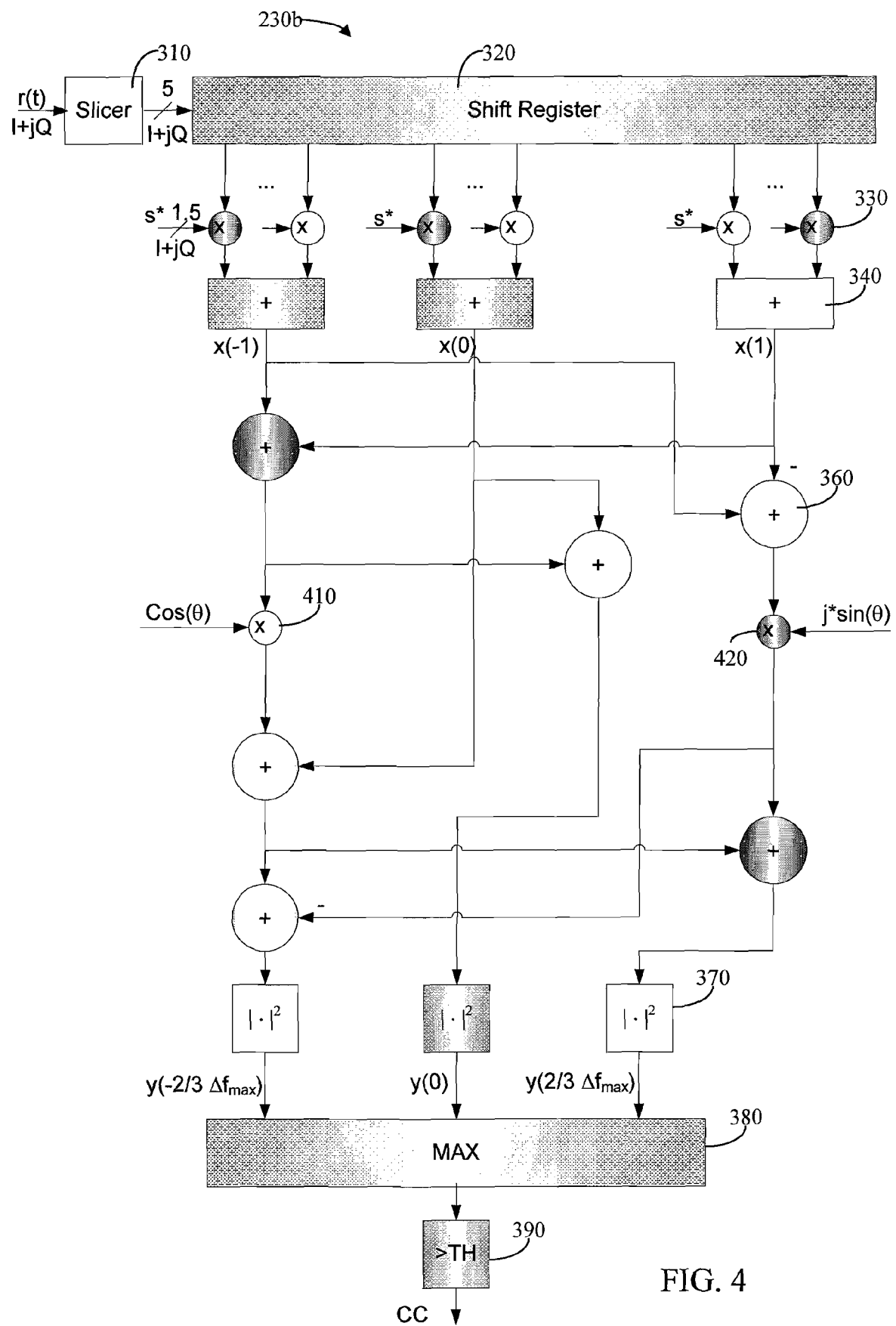
FIG. 4 is a block diagram illustrating a packet detector according to an embodiment of the invention.

FIG. 4 is a block diagram illustrating a packet detector 230b according to an embodiment of the invention. For three value of frequency offset, there are three optimal values:

$$\Delta f = \begin{cases} -\frac{2}{3} \cdot \Delta f_{max} \\ 0 \\ \frac{2}{3} \cdot \Delta f_{max} \end{cases}$$

where $$\Delta f_{max} = 1625 \text{ MHz} \cdot 200 \text{ ppm} = 325 \text{ kHz}$$

is calculated for the maximum RF center frequency of 1625 MHz and maximum frequency offset of 200 ppm between the Tx and the Rx. The optimal three values of frequency offsets above were selected to cover the frequency range of $(-\Delta f_{max}, +\Delta f_{max})$ optimally. A maximum frequency error of $\Delta f_{max}/3$ occurs for $\Delta f = \pm \Delta f_{max}$ or $\Delta f = \pm \Delta f_{max}/3$.

The values of cosine and sine are constants, which can be further approximated to simplify the multiplications by complex values. For the above embodiment of three values of frequency offsets and three segments (K=3):

$$y(\Delta f) \approx \left| x(0) + (x(-1) + x(1)) \cdot \cos\left(2\pi \cdot \Delta f \cdot \Delta t \cdot \frac{N}{K}\right) + j \cdot (x(-1) - x(1)) \cdot \sin\left(2\pi \cdot \Delta f \cdot \Delta t \cdot \frac{N}{K}\right) \right|^2$$

For each $\Delta f$, there are only two constants, cosine and sine:

$$C_1(\Delta f) = \cos\left(2\pi \cdot \Delta f \cdot \Delta t \cdot \frac{N}{K}\right)$$

$$C_2(\Delta f) = \sin\left(2\pi \cdot \Delta f \cdot \Delta t \cdot \frac{N}{K}\right)$$

For the three possible frequency offset values:

$$y(-2/3\Delta f_{max}) \approx \left| \begin{array}{l} x(0) + (x(-1) + x(1)) \cdot \cos\left(2\pi \cdot 2/3\Delta f_{max} \cdot \Delta t \cdot \frac{N}{K}\right) - \\ j \cdot (x(-1) - x(1)) \cdot \sin\left(2\pi \cdot 2/3\Delta f_{max} \cdot \Delta t \cdot \frac{N}{K}\right) \end{array} \right|^2$$

$$y(0) \approx |x(0) + (x(-1) + x(1))|^2$$

$$y(2/3\Delta f_{max}) \approx \left| \begin{array}{l} x(0) + (x(-1) + x(1)) \cdot \cos\left(2\pi \cdot 2/3\Delta f_{max} \cdot \Delta t \cdot \frac{N}{K}\right) + \\ j \cdot (x(-1) - x(1)) \cdot \sin\left(2\pi \cdot 2/3\Delta f_{max} \cdot \Delta t \cdot \frac{N}{K}\right) \end{array} \right|^2$$

After simplification, there is a need for two multipliers of a real constant by a complex value only, or four simple multipliers of a real value by a constant.

The cross-correlation computation is very complex because it requires a new cross-correlation value for every sample. In order to simplify the implementation, one of the following approximations can be done:
1. Using the sign of the received signal, r, and 1.5 bits for the expected samples, s. The expected samples, s, can have values from the set {−1, 0, 1}.
2. Using the sign of the received signal, r, and the expected samples, s
3. Using the sign of the expected samples, s, only
4. Using the sign of the received signal, r, only The cross-correlation may be normalized by the received signal power. Or, equivalently, the threshold may be multiplied by the received signal power. There is no need to normalize by the received signal power when the sign of the received signal is used.

In an embodiment, there are three segments K=3 and three frequency offsets. The three phase offsets are ±$\Delta f\_max*\frac{2}{3}$=±325 kHz*$\frac{2}{3}$, and the center is 0. The maximum frequency error is $\Delta f\_max/3$. The embodiment of the cross-correlation is shown in FIG. 4. Note that when the expected signal, s, uses a Binary Phase-Shift Keying (BPSK) constellation in the time domain, it can be assumed that s is a real signal with values of ±1. However, when the expected signal, s, uses the BPSK constellation in the frequency domain, the time domain signal, s, can be represented by complex values from the set of {−1, 0, 1}.

Accordingly, the packet detector 230b is substantially similar to the packet detector 230a except for the multipliers 410 and 420, which are for cosine and sin multiplication, respectively.

Figure 5:
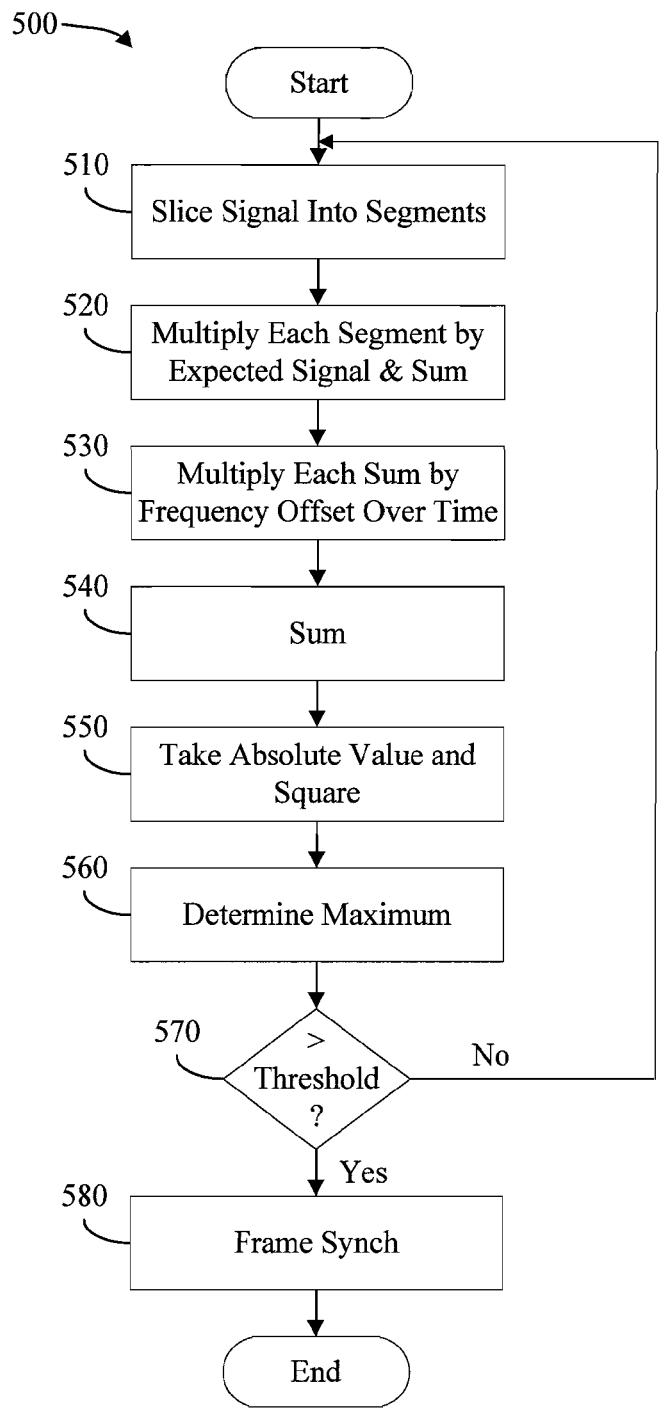
FIG. 5 is a flowchart illustrating a method of packet detection according to an embodiment of the invention.

FIG. 5 is a flowchart illustrating a method 500 of packet detection according to an embodiment of the invention. First, a signal is sliced (segmented) (510) into segments. Then, each segment is multiplied (520) by the expected signal and summed. After, each sum is multiplied (530) by frequency offset over time (a constant) and summed (540). The absolute value is taken (550) and squared and the maximum determined (560). If greater than a threshold (570), then a packet has been detected and the method 500 continues to frame synchronization (580), signal processing, etc. Otherwise, the method 510 repeats.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method implemented with a packet detector, comprising:
   segmenting, with a segmenter of the packet detector, a received signal;
   cross-correlating, with a cross-correlator of the packet detector, each segment with an expected signal; and
   correcting a phase of each correlated segment, with the cross-correlator, by de-rotation according to an expected phase offset due to assumed frequency offset,
   wherein the cross correlation as a function of frequency offset is:

$$y(\Delta f) \approx \left| x(0) + \sum_{n=1}^{\frac{K-1}{2}} (x(-n) + x(n)) \cdot \cos\left(2\pi \cdot \Delta f \cdot \Delta t \cdot \frac{N}{K} \cdot n\right) + j \cdot (x(-n) - x(n)) \cdot \sin\left(2\pi \cdot \Delta f \cdot \Delta t \cdot \frac{N}{K} \cdot n\right) \right|^2$$

wherein $\Delta f$ is the assumed frequency offset correction, K is the number of segments, N is a number of samples, $\Delta t$ is an inverse of sampling clock frequency, and x is the cross-correlation of each segment.

2. The method of claim 1, wherein the expected phase offset is a constant at a beginning of each segment.

3. The method of claim 1, wherein the expected phase offset is a constant at any same location of each segment.

4. The method of claim 1, wherein 3 values of $\Delta f$ are used and and the values are a fraction of a maximum frequency offset.

5. The method of claim 4, wherein the maximum frequency offset is approximately 325 kHz.

6. The method of claim 1, further comprising coherently summing the cross-correlations after the de-rotation.

7. The method of claim 1, wherein a sign of the expected signal is used in place of the expected signal.

8. A packet detector, comprising:
   a slicer that segments a received signal; and
   a cross correlator that cross-correlates each segment with an expected signal, wherein the cross correlator corrects a phase of each correlated segment by de-rotation according to an expected phase offset due to assumed frequency offset, wherein the cross correlation as a function of frequency offset is:

$$y(\Delta f) \approx \left| x(0) + \sum_{n=1}^{\frac{K-1}{2}} (x(-n) + x(n)) \cdot \cos\left(2\pi \cdot \Delta f \cdot \Delta t \cdot \frac{N}{K} \cdot n\right) + j \cdot (x(-n) - x(n)) \cdot \sin\left(2\pi \cdot \Delta f \cdot \Delta t \cdot \frac{N}{K} \cdot n\right) \right|^2$$

wherein $\Delta f$ is the assumed frequency offset correction, K is the number of segments, N is a number of samples, $\Delta t$ is an inverse of sampling clock frequency, and x is the cross-correlation of each segment.

9. The detector of claim 8, wherein the expected phase offset is a constant at a beginning of each segment.

10. The detector of claim 8, wherein the expected phase offset is a constant at any same location of each segment.

11. The detector of claim 8, wherein 3 values of $\Delta f$ are used and wherein the values are a fraction of a maximum frequency offset.

12. The detector of claim 11, wherein the maximum frequency offset is approximately 325 kHz.

13. The detector of claim 8, further comprising coherently summing the cross-correlations after the de-rotation.

14. The detector of claim 8, wherein a sign of the expected signal is used in place of the expected signal.

15. A receiver, comprising:
a receiving block that receives a signal;
an analog front end coupled to the receiving block that produces I and Q signals from the received signal;
an analog-to-digital converter coupled to the front end that converts the I and Q signals to digital form;
a packet detector coupled to the analog-to-digital converter, the packet detector comprising a slicer that segments the I and Q signals; and a cross correlator that cross-correlates each segment with an expected signal;
a frame synch block coupled to the packet detector that established frame synchronization; and
a signal processing block coupled to the frame synch block that processes the signal,
wherein the cross correlator corrects a phase of each correlated segment by de-rotation according to an expected phase offset due to assumed frequency offset,
wherein the cross correlation as a function of frequency offset is:

$$y(\Delta f) \approx \left| x(0) + \sum_{n=1}^{\frac{K-1}{2}} (x(-n) + x(n)) \cdot \cos\left(2\pi \cdot \Delta f \cdot \Delta t \cdot \frac{N}{K} \cdot n\right) + j \cdot (x(-n) - x(n)) \cdot \sin\left(2\pi \cdot \Delta f \cdot \Delta t \cdot \frac{N}{K} \cdot n\right) \right|^2$$

wherein $\Delta f$ is the assumed frequency offset correction, K is the number of segments, N is a number of samples, $\Delta t$ is an inverse of sampling clock frequency, and x is the cross-correlation of each segment.

* * * * *